United States Patent
Petrie et al.

(10) Patent No.: US 12,281,049 B2
(45) Date of Patent: Apr. 22, 2025

(54) EMBEDDING SENSORS IN 3D-PRINTED SILICON CARBIDE

(71) Applicant: UT-Battelle, LLC, Oak Ridge, TN (US)

(72) Inventors: Christian M. Petrie, Oak Ridge, TN (US); Brian C. Jolly, Oak Ridge, TN (US); Kurt A. Terrani, Oak Ridge, TN (US); Michael P. Trammell, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 18/640,294

(22) Filed: Apr. 19, 2024

(65) Prior Publication Data
US 2024/0279127 A1    Aug. 22, 2024

Related U.S. Application Data

(62) Division of application No. 17/142,315, filed on Jan. 6, 2021, now Pat. No. 11,964,918.
(Continued)

(51) Int. Cl.
*G01D 11/24*    (2006.01)
*C04B 35/565*   (2006.01)
(Continued)

(52) U.S. Cl.
CPC .......... *C04B 37/021* (2013.01); *C04B 35/565* (2013.01); *C04B 35/63* (2013.01);
(Continued)

(58) Field of Classification Search
CPC ..... C04B 37/021; C04B 35/565; C04B 35/63; C04B 37/042; G01D 11/245
See application file for complete search history.

(56) References Cited

U.S. PATENT DOCUMENTS

| | | | |
|---|---|---|---|
| 11,964,918 B2* | 4/2024 | Petrie | B33Y 80/00 |
| 2002/0071804 A1* | 6/2002 | Golan | C30B 23/02 |
| | | | 423/346 |
| 2021/0230076 A1* | 7/2021 | Petrie | C04B 35/63 |

FOREIGN PATENT DOCUMENTS

| | | |
|---|---|---|
| AT | 409547 B | 9/2002 |
| CA | 2383670 C | 11/2005 |

(Continued)

OTHER PUBLICATIONS

Ren, W. and R. Swindeman, "A Review on Current Status of Alloys 617 and 230 for Gen IV Nuclear Reactor Internals and Heat Exchangers," Journal of Pressure Vessel Technology, 131 (2009) p. 044002.

(Continued)

*Primary Examiner* — Jamel E Williams
(74) *Attorney, Agent, or Firm* — WARNER NORCROSS + JUDD LLP (57) ABSTRACT

An improved method for embedding one or more sensors in SiC is provided. The method includes depositing a binder onto successive layers of a SiC powder feedstock to produce a dimensionally stable green body have a true-sized cavity. A sensor component is then press-fit into the true-sized cavity. Alternatively, the green body is printed around the sensor component. The assembly (the green body and the sensor component) is heated within a chemical vapor infiltration (CVI) chamber for debinding, and a precursor gas is introduced for densifying the SiC matrix material. During infiltration, the sensor component becomes bonded to the densified SiC matrix, the sensor component being selected to be thermodynamically compatible with CVI byproducts at elevated temperatures, including temperatures in excess of 1000° C.

7 Claims, 7 Drawing Sheets

Related U.S. Application Data (60) Provisional application No. 62/965,302, filed on Jan. 24, 2020.

(51) Int. Cl.
   *C04B 35/63* (2006.01)
   *C04B 37/02* (2006.01)
   *C04B 37/04* (2006.01)

(52) U.S. Cl.
   CPC .......... *C04B 37/042* (2013.01); *G01D 11/245* (2013.01); *C04B 2235/3826* (2013.01); *C04B 2235/6026* (2013.01); *C04B 2237/365* (2013.01); *C04B 2237/403* (2013.01); *C04B 2237/408* (2013.01); *C04B 2237/62* (2013.01)

(56) References Cited

FOREIGN PATENT DOCUMENTS

| RU | 2558876 C1 | 8/2015 | |
|---|---|---|---|
| WO | WO-2016018343 A1 * | 2/2016 | ............. E21B 17/00 |

OTHER PUBLICATIONS

Wood, T. W., B. Blake, T. E. Blue, C. M. Petrie and D. Hawn, "Evaluation of the Performance of Distributed Temperature Measurements with Single-Mode Fiber Using Rayleigh Backscatter up to 1000° C," IEEE Sensors Journal, 14 (2014) p. 124-128.

Cheymol, G., H. Long, J. F. Villard and B. Brichard, "High Level Gamma and Neutron Irradiation of Silica Optical Fibers in Cea Osiris Nuclear Reactor," IEEE Transactions on Nuclear Science, 55 (2008) p. 2252-2258.

Zaghloul, M. A. S. et al., "Radiation resistant fiber Bragg grating in random air-line fibers for sensing applications in nuclear reactor cores," Optics Express, 26 (2018) p. 11775-11786.

Petrie, C. M., D. P. Hawn, W. Windl and T. E. Blue, "Reactor radiation-induced attenuation in fused silica optical fibers heated up to 1000° C ," Journal of Non-Crystalline Solids, 409 (2015) p. 88-94.

Petrie, C. M. and T. E. Blue, "In Situ Thermally Induced Attenuation in Sapphire Optical Fibers Heated to 1400° C," Journal of the American Ceramic Society, 98 (2015) p. 483-489.

Wilson, B. A., C. M. Petrie and T. E. Blue, "High-temperature effects on the light transmission through sapphire optical fiber," Journal of the American Ceramic Society, 101 (2018) p. 3452-3459.

Petrie, C. M., B. Wilson and T. E. Blue, "In Situ Gamma Radiation-Induced Attenuation in Sapphire Optical Fibers Heated to 1000° C," Journal of the American Ceramic Society, 97 (2014) p. 3150-3156.

Petrie, C. M. et al., "Embedded metallized optical fibers for high temperature applications," Smart Materials and Structures, 28 (2019).

Petrie, C. M., N. Sridharan, A. Hehr, M. Norfolk and J. Sheridan, "High-temperature strain monitoring of stainless steel using fiber optics embedded in ultrasonically consolidated nickel layers," Smart Materials and Structures, 28 (2019) p. 085041.

Petrie, C. et al., "Embedded Fiber Optic Sensors for In-Pile Applications," in 11th Nuclear Plant Instrumentation, Control and Human-Machine Interface Technologies. 2019: Orlando, FL, USA. p. 459-468.

K. Terrani, B. Jolly and M. Trammell, "3D printing of high purity silicon carbide," Journal of the American Ceramic Society vol. 103 (2020) p. 1575-1581.

\* cited by examiner

EMBEDDING SENSORS IN 3D-PRINTED SILICON CARBIDE

CROSS-REFERENCE TO RELATED APPLICATIONS

This application is a divisional of U.S. patent application Ser. No. 17/142,315, filed Jan. 6, 2021, which claims the benefit of U.S. Provisional Application No. 62/965,302, filed Jan. 24, 2020, the disclosures of which are incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to chemical vapor infiltration of silicon carbide green bodies having embedded sensor components contained therein.

BACKGROUND OF THE INVENTION

Silicon carbide (SiC) has excellent physical, thermal, and mechanical properties. These properties include high strength, high elastic modulus, high creep resistance, low density, and low oxidation rates in air and other atmospheres such as steam and combustion. These properties make SiC attractive for many engineering applications, including the manufacture of high-temperature heat exchangers and nuclear reactor systems. However, technological advancements have been stifled by manufacturing constraints, which are quite limiting for ceramics such as SiC.

SiC in monolithic form has been made by sintering, hot pressing, and spark plasma sintering. These methods are sufficient for making highly dense material with good microstructure, but the geometries are simple, axis-symmetrical, and usually require costly machining. More recently, methods have been developed to form SiC preforms with slightly more complex geometries such as slip casting, tape casting, gel casting, and injection molding. These methods use solvent-based slurries with dispersed powders to shape parts, typically with dies. Although they provide more freedom compared to compacts and pressure-assisted methods, there are still some designs with internal features that are not achievable, and there remains a cost associated with the die tooling.

In addition, there is currently no scalable way in which to embed sensors in SiC components. SiC ceramic matrix composites are typically fabricated in simple geometries (tubes, plates, or rectangular channels) using a braded weave of SiC fibers that can be infiltrated using chemical vapor infiltration (CVI). Monolithic SiC components can be fabricated using CVI followed by limited post machining. However, these techniques do not allow for the embedding of sensors. Accordingly, there remains a continued to need for a method for the embedding of sensors into SiC articles, and in particular, a continued need for a scalable manufacturing method in which the embedded sensor is able to survive extremely high temperatures and chemically aggressive environments.

SUMMARY OF THE INVENTION

An improved method for embedding one or more sensors in SiC is provided. The method includes depositing a binder onto successive layers of a SiC powder feedstock to produce a dimensionally stable green body having a true-sized cavity. A sensor component is then press-fit into the true-sized cavity. Alternatively, the green body is printed around the sensor component. The assembly (the green body and the sensor component) is heated within a chemical vapor infiltration (CVI) chamber for debinding, and a precursor gas is introduced for densifying the SiC matrix material. During infiltration, the sensor component becomes bonded to the densified SiC matrix, the sensor component being selected to be thermodynamically compatible with CVI byproducts at elevated temperatures, including temperatures in excess of 1000° C.

In one embodiment, the method includes selectively depositing a binding agent onto successive layers of a silicon carbide powder feedstock according to a binder-jet process to produce a three-dimensional green body having a silicon carbide matrix. The method also includes inserting a sensor component within a channel in the green body, or printing the green body around the sensor component, the sensor component being formed from metal or metal alloy having a melting point above 1000° C. The method then includes heat treating the green body to remove the binding agent and densifying the silicon carbide matrix according to a chemical vapor infiltration process, wherein the densified silicon carbide matrix includes a substantially pure silicon carbide microstructure. The embedded sensor component can be formed from Mo, Nb, Ta, W, Pt, Au, or alloys of the same.

The present method is well suited for fabricating embedded sensors such as thermocouples, neutron detectors, and strain sensors for applications inside a nuclear fuel compact or a structural component having a complex geometry. The present method can also be used to embed thermocouples inside a heat exchanger to monitor the transfer of heat from the primary fluid to the secondary fluid in nuclear applications. In some applications, the embedded sensor component can include a sheath, the sheath being an interface between the sensor and the densified silicon carbide matrix. The sheath can include molybdenum, optionally in embodiments where the sensor component includes a refractory metal. In embodiments where the sensor component includes an optical fiber, the sheath is optionally gold, however other sheaths can be used in other embodiments.

These and other features of the invention will be more fully understood and appreciated by reference to the description of the embodiments and the drawings.

DETAILED DESCRIPTION OF THE CURRENT EMBODIMENT

As discussed herein, the current embodiments generally relate to a method for embedding one or more sensor components in a ceramic matrix, for example a silicon carbide matrix. The method generally includes the additive manufacture of a green body from a powder-based matrix material, the positioning of a sensor component within the green body, and the densification of the matrix material via chemical vapor infiltration (CVI). The method of manufacture is generally discussed in Part I below, followed by a description of various embedded sensors formed according to this method in Part II below. Though described in connection with a silicon carbide matrix material, the present method can include other ceramic matrix materials, including aluminum oxide and silicon dioxide.

I. Method of Manufacture

A method according to one embodiment includes the manufacture of an embedded sensor. The method generally includes (a) the additive manufacture of a green body having a silicon carbide matrix, (b) the positioning of a sensor component within the green body, either during additive manufacturing or thereafter, and (c) densification of the silicon carbide matrix via CVI around the sensor component, such that the green body forms a CVI-densified sensor envelope that houses, and is at least partially bonded to, the sensor component contained therein. Each such operation is separately discussed below.

The additive manufacture of a green body can include a binderjet printing process. In the binder-jet printing process, a powder bed of silicon carbide feedstock is printed at ambient temperatures with a binder pattern layer-by-layer. In particular, the silicon carbide feedstock is deposited in sequential layers, one on top of the other. Following the deposition of each layer of feedstock, a liquid binding agent is selectively applied to the layer of feedstock in accordance with a computer model (e.g., CAD model) of the green body. Once the green body is completed, the unbound feedstock is removed, yielding a near net-shaped three-dimensional object held together by the binder.

Positioning a sensor component within the green body can occur during or after the additive manufacture of the green body. To position the sensor component within the green body during the additive manufacture of the green body, the sensor component can be positioned on a build platform, and the green body can be printed around the sensor component, layer by layer. Alternatively, the sensor component can be disposed upon a partial build, and the remainder of the build is completed, layer by layer, atop the sensor component to encapsulate the sensor component within the green body. To position the sensor component within the green body after the additive manufacture of the green body, the green body can be formed with a channel extending along a path and being open to the exterior of the green body. Alternatively, the green body can be formed with a cavity that is open to the exterior of the green body. The sensor component is then inserted or press-fit into the channel or cavity. The sensor component can partially protrude from the channel or cavity, as in the case of an optical fiber or thermocouple, or can be fully seated within the channel or cavity such that no portion of the sensor component is visible.

Densification of the green body around the sensor component via CVI includes positioning the green body in a CVI furnace (reactor vessel) into which a gaseous precursor is admitted. The gaseous precursor for CVI of the green body can include Methyltrichlorosilane (MTS), which yields silicon carbide by the MTS decomposing. The pressure and temperature within the furnace and the composition, partial pressure and flow rate of the gaseous precursor are selected to allow the gaseous precursor to diffuse within the pores of the green body as generally set forth in U.S. Publication 2020/0156282 to Terrani et al, the disclosure of which is hereby incorporated by reference. More specifically, CVI involves the thermal decomposition of the gaseous precursor (e.g., MTS) and the infiltration and then absorption of the decomposed precursor within the pores of the silicon carbide matrix. The CVI process for SiC involves a process temperature of between 850° C. and 1300° C., 1000° C. and 1200° C., optionally 1100° C. As the temperatures increase within the CVI furnace, the binder dissociates and is removed prior to the start of the CVI process. The CVI process initially uniformly densifies the green body, and as the pores inside the green body become closed, the CVI selectively deposits a fully dense coating on all internal and external surfaces of the three-dimensional object. The microstructure of the sensor envelope includes a first (original) silicon carbide phase and a second (additional) silicon carbide phase in a continuous silicon carbide matrix. In addition, the silicon carbide matrix is at least partially bonded to the sensor component contained within the sensor envelope, discussed in Part II below.

The sensor components are optionally monitored during CVI and during the subsequent heating in an inert environment. Example sensor components include Mo-shielded thermocouples, Mo-shielded fiber optic temperature sensors, and fiber optic strain sensors directly embedded in the silicon carbide matrix. The present method is well suited for applications where high heat resistance and/or high corrosion resistance is desired. Because the green body that is formed according to an additive manufacturing process, the sensor envelope can include an undercut, an overhang, or other complex geometries, which are otherwise difficult or impossible according to other manufacturing methods.

II. Embedded Sensors

Figure 1:
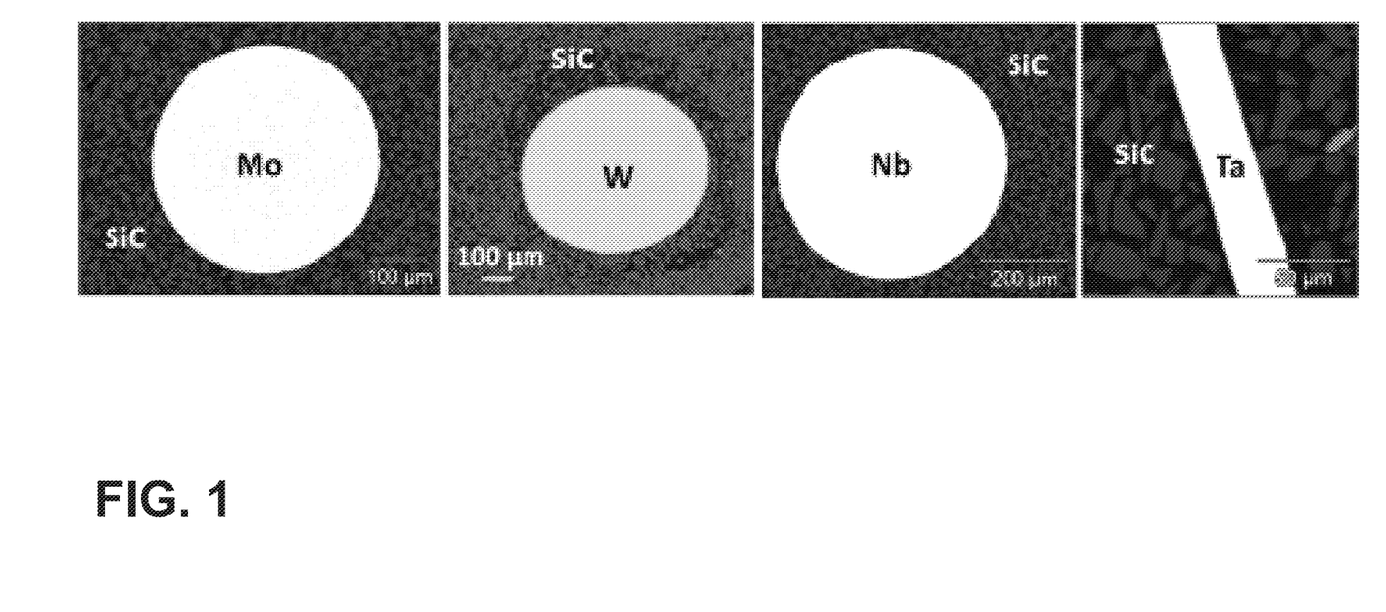
FIG. 1 includes scanning electron microscope ("SEM") images of various refractory metals that are embedded within a printed and densified silicon carbide matrix.

A wide variety of embedded sensors can be formed according to the method of the present invention. The embedded sensors generally include (a) a sensor component and (b) a sensor envelope comprising a densified silicon carbide matrix. The sensor component is generally required to be thermodynamically compatible with CVI byproducts at elevated temperatures, including temperatures in excess of 1000° C. Where MTS is the gaseous precursor for CVI, the sensor component is selected to be thermodynamically compatible with $H_2$, HCl, and SiC at temperatures of about 1000° C. The sensor component can include refractory metals such as Mo, W, Nb, and Ta, and FIG. 1 shows scanning electron microscopy (SEM) images of the interface between a silicon carbide sensor envelope and a simulated sensor component formed of these refractory metals.

Figure 2:
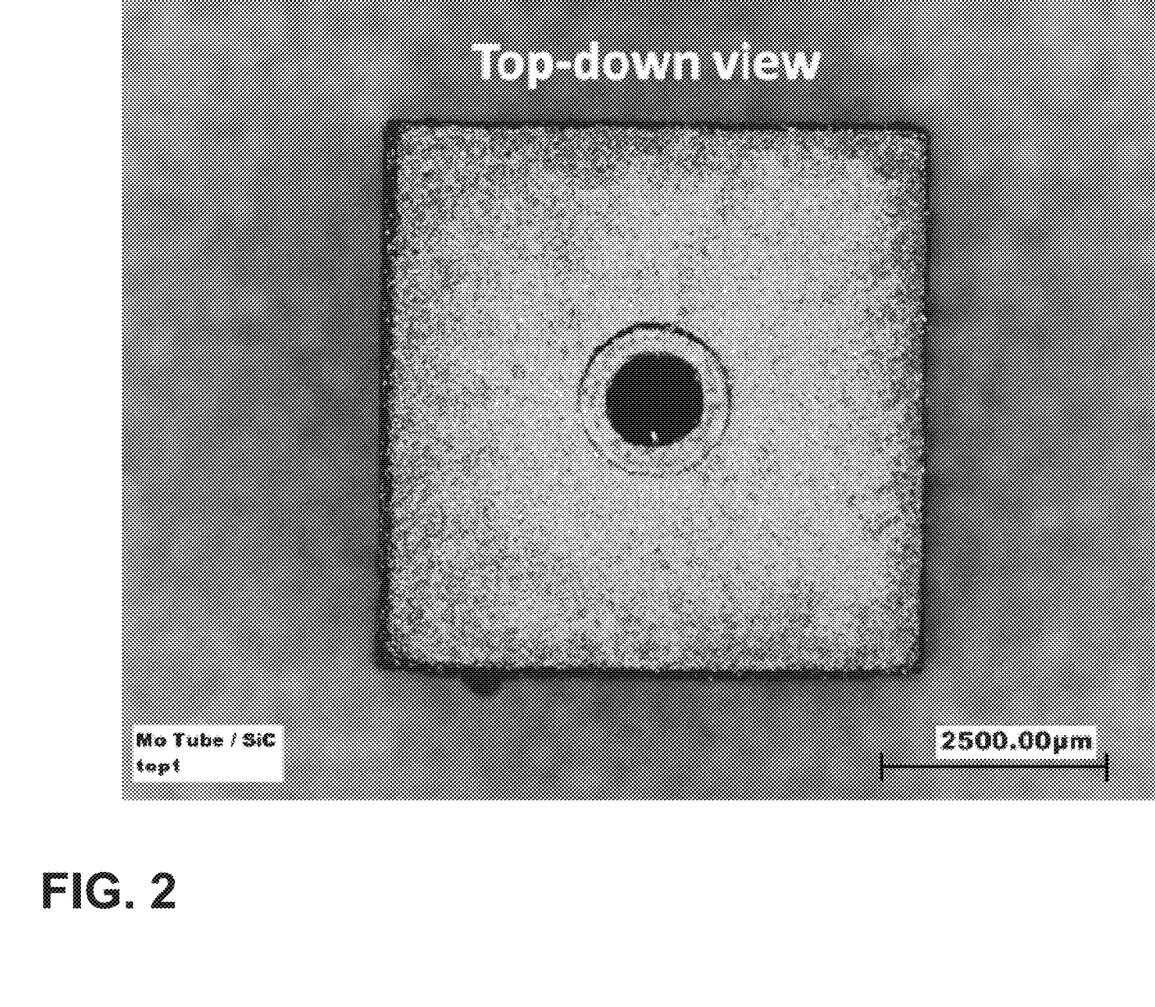
FIG. 2 is a top-down view of an embedded sensor including a prismatic sensor envelope and a tubular sheath formed of molybdenum.
Figure 3:
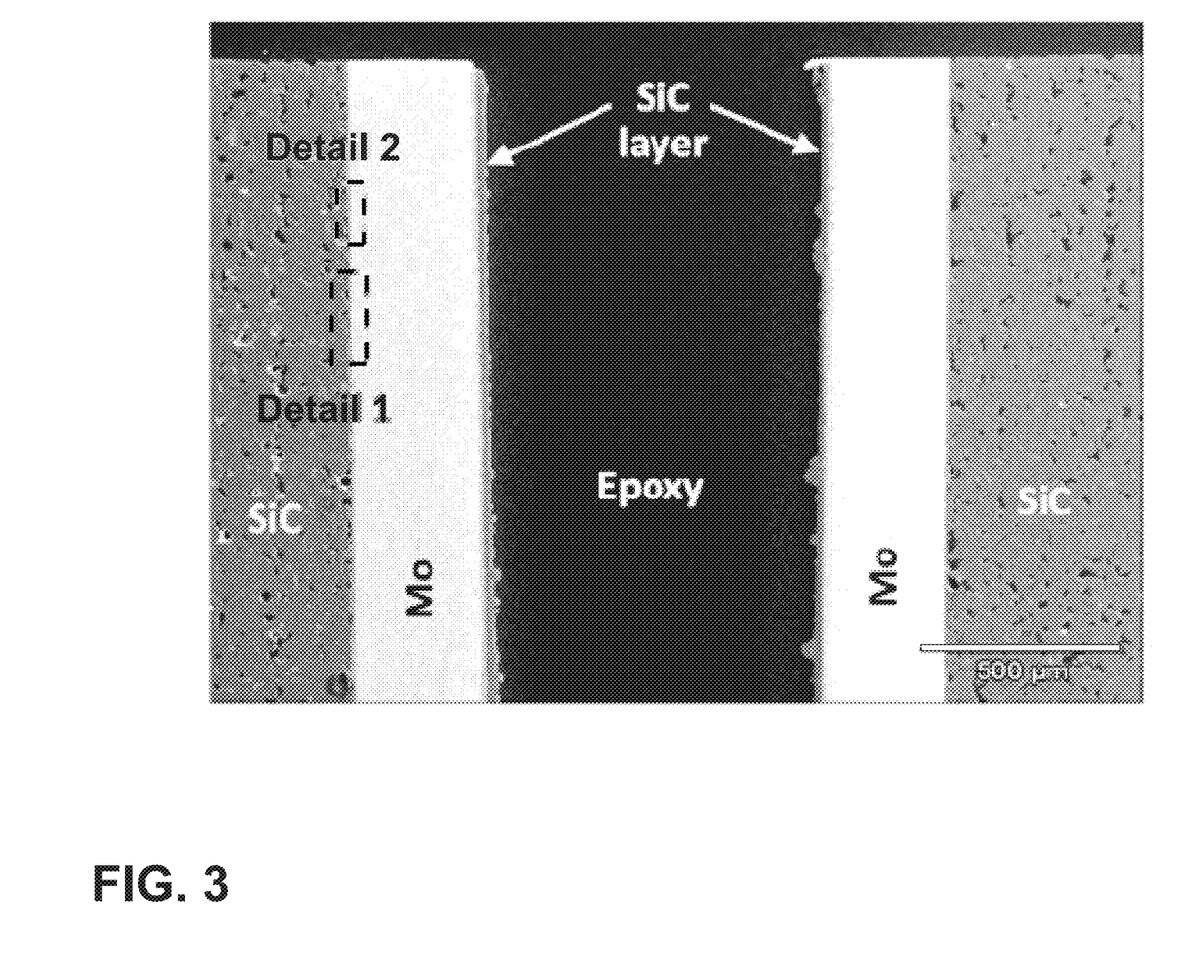
FIG. 3 is a cross-sectional view of the embedded sensor showing a molybdenum sheath within a silicon carbide matrix.
Figure 4:
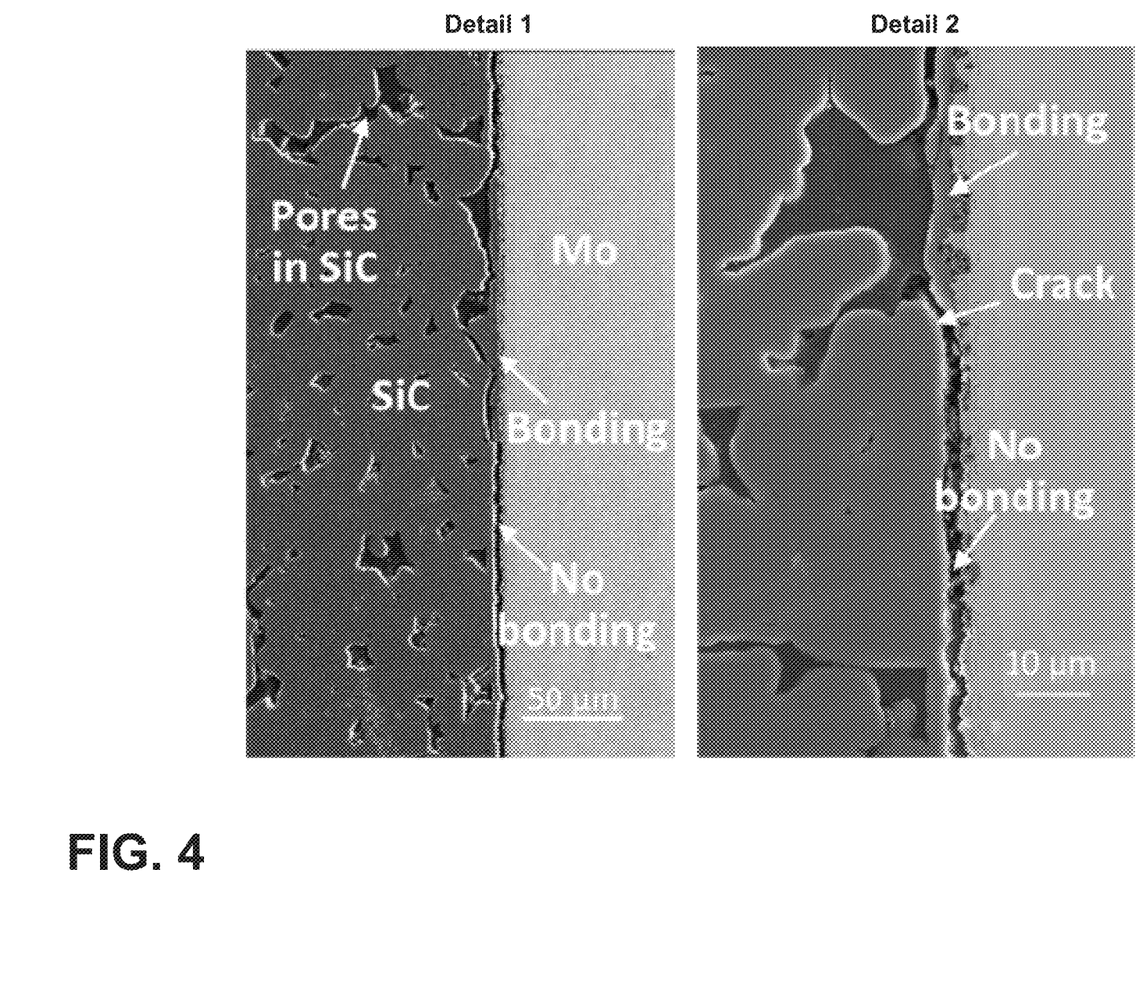
FIG. 4 includes SEM images of detail 1 and detail 2 from FIG. 3, illustrating partial bonding of a molybdenum sheath to a silicon carbide matrix.

The sensor component can also include a sheath. A sheath can function as a barrier between the silicon carbide matrix and a sensor element, for example an optical fiber. As shown in FIG. 2, for example, the embedded sensor includes a molybdenum sheath surrounded by a prismatic sensor envelope comprising a densified silicon carbide matrix. FIGS. 3 and 4 show SEM images of the interface between the sheath and the silicon carbide sensor envelope. The SEM images show that the sheath was successfully embedded in silicon carbide, although the interface between the sheath and the matrix shows some regions where bonding has occurred and others where there is no bonding. Cracks are also visible. The sheath does not uniformly bond to the matrix, but this is expected. Bonding was found to occur at approximately 1000° C. As the embedded sensor cools to room temperature, the sheath contracts much more than the silicon carbide matrix due to the difference in coefficients of thermal expansion. The approximate differential thermal strain was calculated to be 0.14%, which amounts to a stress on the order of hundreds of MPa. This stress can exceed the bonding strength at the interface between the sheath and the silicon carbide matrix, as evidenced by limited de-bonding in Detail 1 and Detail 2 of FIG. 4. However, except for strain sensors, many sensors do not require a sensor sheath that is uniformly bonded to the surrounding silicon carbide matrix.

Figure 5:
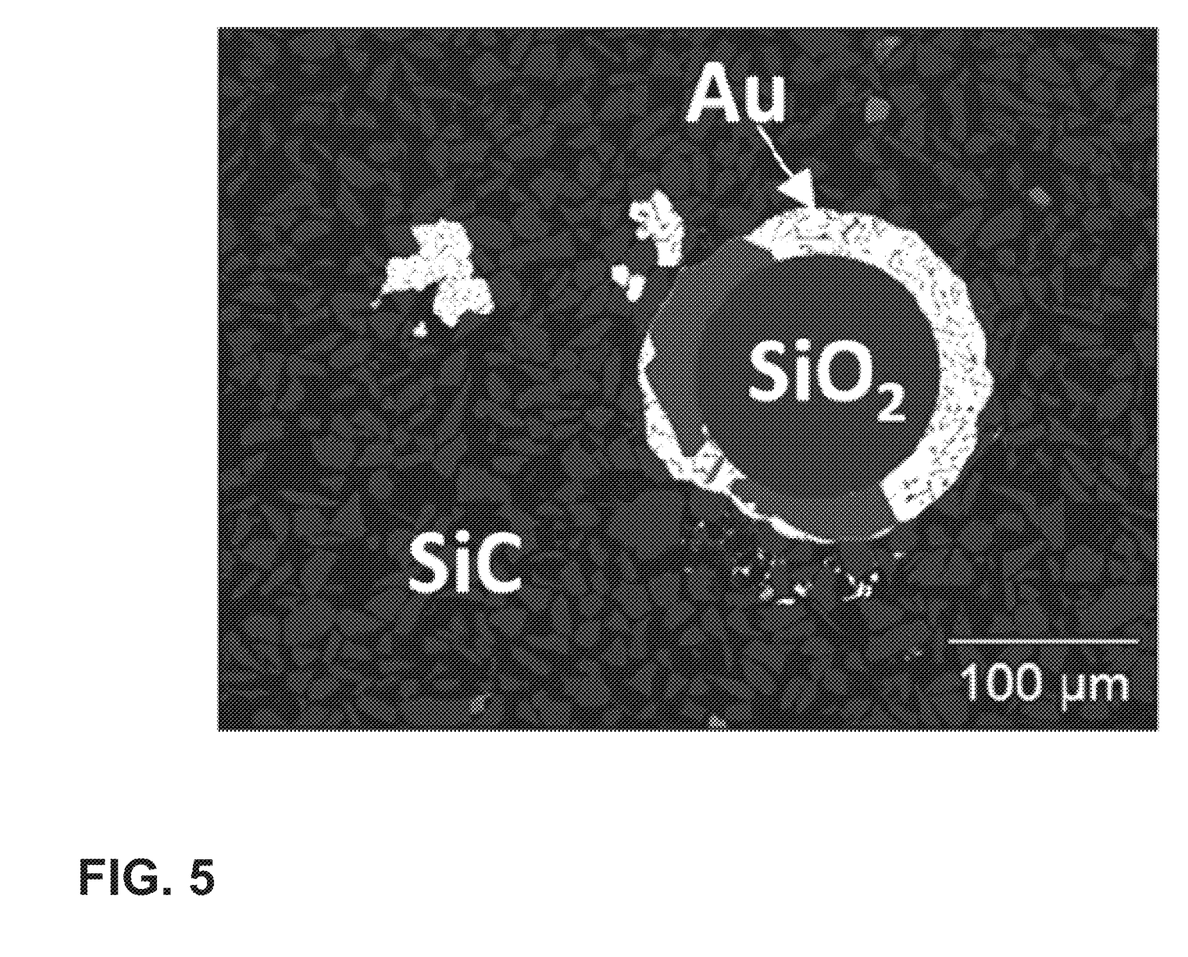
FIG. 5 includes an SEM image of a gold-coated fiber embedded in a silicon carbide matrix.

For applications that include embedded optical sensors, the optical fiber may itself be embedded in the silicon carbide matrix as a bare optical fiber. In other embodiments, the optical fiber can be electroplated with a metal coating, for example Au, Cu, or Pt. FIG. 5 shows a gold-coated silicon dioxide optical fiber that is embedded in a densified silicon carbide matrix. The Au sheath functions as a barrier between the silicon carbide matrix and the optical fiber.

Figure 6:
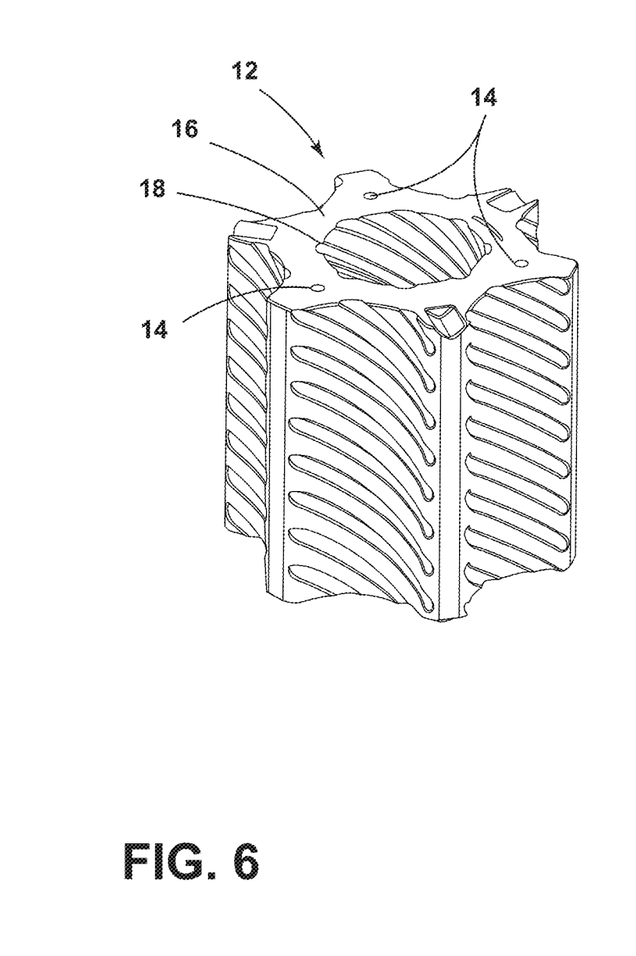
FIG. 6 includes a perspective view of an embedded sensor in accordance with one embodiment.

The present invention allows for the manufacture of sensor envelopes having complex geometries for harsh environments. For nuclear systems, this can include embedding thermocouples at the most limiting locations (i.e., those locations having the highest temperatures). As shown in FIG. 6 for example, an embedded sensor is illustrated and generally designated 10. The embedded sensor 10 includes a sensor envelope 12 comprising a densified silicon carbide matrix that is manufactured according to the method in Part I above. The sensor envelope 12 also includes multiple internal cavities. Three vertical channels 14 are defined in a hexagonal sidewall 16, each being open to the exterior of the sensor envelope 12, and a fluid flow channel 18 extends through the sensor envelope. The embedded sensor 10 according to this embodiment includes four sensor components contained therein: a fiber optic temperature or strain sensor 20 and three thermocouples or self-powered neutron detectors 22. The fiber optic temperature or strain sensor 20 is encapsulated within the sensor envelope 12 and includes a helical pattern, with successive windings being axially offset from each other. The fiber optic temperature or strain sensor 20 includes a terminal end that protrudes vertically from an opening in the upper axial surface of the sensor envelope 12. In the case of the fiber optic temperature or strain sensor 20, the green body is printed with a helical channel and the fiber optic temperature or strain sensor 20 is inserted therein prior to CVI densification of the silicon carbide matrix. The helical channel can also be filled with loose SiC powder prior to CVI densification. In the case of the thermocouples or self-powered neutron detectors 22, the green body is binder-jet printed with three vertical channels 14, and the thermocouples or self-powered neutron detectors 22 are inserted or press-fit within the green body prior to CVI densification of the silicon carbide matrix. The resulting embedded sensor 10 includes multiple sensor components 20, 22 each being at least partially bonded to the silicon carbide matrix.

Figure 7:
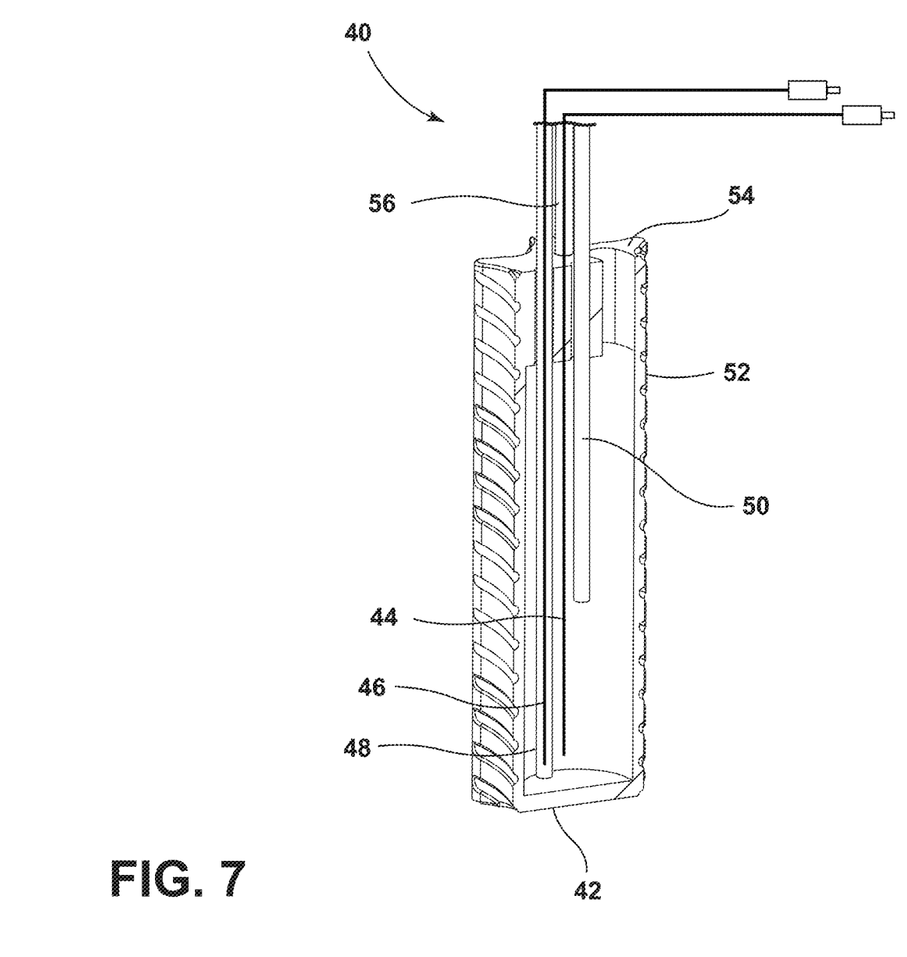
FIG. 7 includes a perspective view of an embedded sensor in accordance with a laboratory example of the present invention.

As optionally shown in FIG. 7, an embedded sensor 40 was prepared in accordance with a laboratory example. The embedded sensor 40 included a binder-jet printed SiC sensor envelope 42 and three sensor components. The first sensor component included an optical fiber 44 for strain sensing, the second sensor component included an optical fiber 46 loosely contained within a closed-end Mo sheath 48 for spatially distributed temperature sensing, and the third sensor component included an Nb-sheathed Mo—Nb thermocouple 50 for temperature sensing. The sensor envelope 42 comprised a sidewall 52 having an end portion 54 with feedthroughs for each sensor component. The fiber lead 44 for the first sensor component was epoxied within a sheath 56 that extended through the end portion 54 and partially into the sensor envelope 42. Loose SiC powder was added through the visible opening in the end portion 54 prior to CVI densification. As demonstrated by this example, the present invention is well suited for fabricating embedded sensors having multiple sensor components such as thermocouples, neutron detectors, and strain sensors. The sensor components can include a sheath, the sheath being an interface between a sensor element and the densified silicon carbide matrix. The present invention can also be used to embed thermocouples inside a heat exchanger to monitor the transfer of heat from a primary fluid to a secondary fluid, optionally in nuclear applications.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. An embedded sensor comprising:
a sensor component; and
a sensor envelope composed of only a silicon carbide matrix, the sensor envelope defining a channel, the channel extending along a path in three dimensions within the sensor envelope and being to the exterior of the sensor envelope,
wherein the sensor component is located in, and extends along the path of, the channel.

2. The embedded sensor of claim 1, wherein the sensor component comprises one of an optical fiber, a thermocouple, a neutron detector, or an ultrasonic waveguide.

3. The embedded sensor of claim 1, wherein the sensor component comprises a sheath formed from a refractory metal.

4. The embedded sensor of claim 1, wherein at least portions of the sensor component are bonded to the sensor envelope.

5. An embedded sensor comprising:
   a sensor component; and
   a sensor envelope composed of only a silicon carbide matrix, the sensor envelope defining a cavity therein, the cavity being entirely enclosed within an interior of the sensor envelope, wherein the sensor component is located in the cavity.

6. The embedded sensor of claim 5, wherein the sensor component comprises a sheath formed from a refractory metal.

7. The embedded sensor of claim 5, wherein at least portions of the sensor component are bonded to the sensor envelope.

* * * * *